US005433580A

United States Patent [19]

Kempf

[11] Patent Number: 5,433,580

[45] Date of Patent: Jul. 18, 1995

[54] WHEELCHAIR LIFT WITH HINGED CONNECTION JOINT

[75] Inventor: Dale Kempf, Modesto, Calif.

[73] Assignee: Hogan Mfg., Inc., Escalon, Calif.

[21] Appl. No.: 56,430

[22] Filed: Apr. 30, 1993

Related U.S. Application Data

[62] Division of Ser. No. 701,143, May 15, 1991, Pat. No. 5,284,414.

[51] Int. Cl.[6] B60P 1/44

[52] U.S. Cl. 414/540; 187/200; 414/921; 414/545; 254/2 R

[58] Field of Search 414/921, 539, 540, 541, 414/542, 543, 680, 495, 544, 545, 546, 556, 557, 558, 140.1, 430; 105/447, 431; 187/9 R, 9 E, 8, 52, 20, 27; 254/2 R, 2 C; 182/141, 142; 14/69.5, 71.3, 71.7, 71.1

[56] References Cited

U.S. PATENT DOCUMENTS

| | | | |
|---|---|---|---|
| 975,017 | 11/1910 | Capra . | |
| 1,167,140 | 1/1916 | Willis | 187/27 |
| 1,979,788 | 11/1934 | Bacher . | |
| 2,456,805 | 12/1948 | Wohlforth . | |
| 3,918,596 | 11/1975 | Ward . | |
| 3,930,587 | 1/1976 | Bliss . | |
| 4,325,668 | 4/1982 | Julian et al. | 414/546 |
| 4,392,771 | 7/1983 | Smalley | 414/921 X |
| 4,441,850 | 4/1984 | Thorley | 414/545 |
| 4,466,771 | 8/1984 | Thorley et al. | 414/787 |
| 4,579,500 | 4/1986 | Robinson | 414/545 |
| 4,627,784 | 12/1986 | Collins | 414/540 |

FOREIGN PATENT DOCUMENTS

| | | | |
|---|---|---|---|
| 54212 | 1/1938 | Denmark | 187/27 |
| 570080 | 5/1930 | Germany | 187/20 |
| 2739549 | 8/1979 | Germany . | |
| 3835546 | 5/1989 | Germany | 182/141 |
| 57-186543 | 11/1982 | Japan . | |
| 672098 | 7/1979 | U.S.S.R. . | |
| 64304 | 11/1982 | WIPO | 414/540 |

*Primary Examiner*—Frank E. Werner
*Attorney, Agent, or Firm*—Christensen, O'Connor, Johnson & Kindness

[57] ABSTRACT

A linkage assembly (20) for use with a platform or step lift (22) for transmitting force from a linear actuator (228) to a ramp (40) pivotally attached to the outer edge of the platform (26) of the lift so as to cause the ramp to travel through a rotational path of at least 180 degrees. The linkage assembly is designed so that no portion thereof extends more than about 0.25 inch above the upper surface (28) of the ramp and the top surface (48) of the platform, and so that the ramp is driven downwardly toward the extended position with a force insufficient to cause serious injury to a person's feet positioned in the path of travel of the ramp. Additionally, a hinge structure (700) is provided for use with a step lift for coupling the platform with its vertical extensions (66, 68) so as to permit the latter to pivot relative to the platform as the extensions move up and down within the vertical guides (80, 82) in which the vertical extensions are slidably received.

5 Claims, 6 Drawing Sheets

Fig. 3.
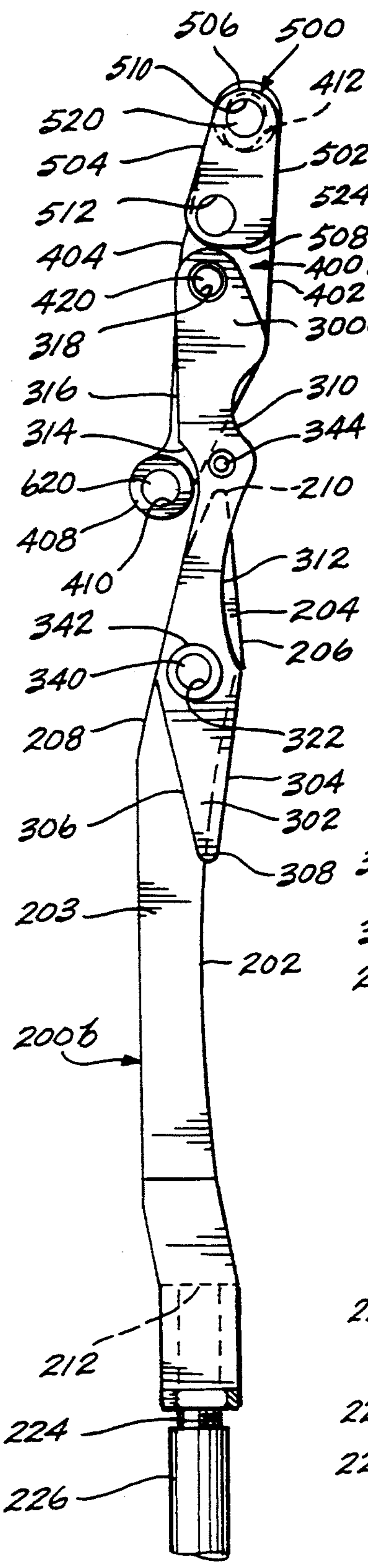
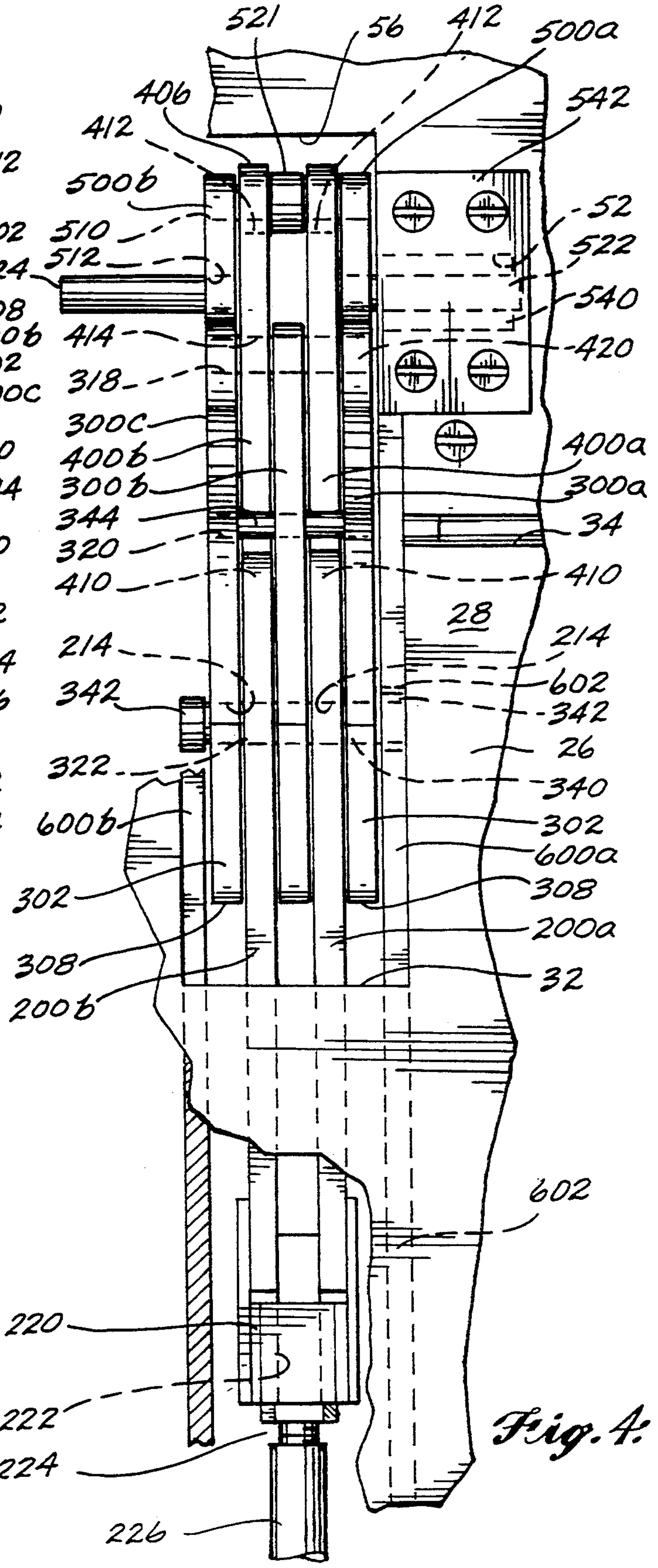
Fig. 4.

WHEELCHAIR LIFT WITH HINGED CONNECTION JOINT

This is a divisional of application Ser. No. 07/701,143, filed on May 15, 1991, now U.S. Pat. No. 5,284,414 the benefit of the filing date of which is hereby claimed under 35 U.S.C. § 120.

FIELD OF THE INVENTION

The present invention relates to wheelchair lifts, and, more particularly, to linkage assemblies for causing the outer barrier of the lift to move between extended and retracted positions, and to hinge assemblies for pivotally coupling selected horizontal and vertical components of a lift.

BACKGROUND OF THE INVENTION

Wheelchair lifts of the type installed in the stairwell of transit vehicles, such as intra-city buses, are well known. One type of wheelchair lift, commonly referred to as a "step lift," is illustrated in U.S. Pat. No. 4,466,771 to Thorley et al. (the "'771 patent"). Another type of wheelchair lift, commonly referred to as a "platform lift," is illustrated in U.S. Pat. No. 4,058,228 to Hall (the "'228 patents").

Step lifts and platform lifts typically comprise a ramp or barrier plate which is pivotally mounted to the platform of the lift so as to be rotatable through an arc of about 180 degrees between a retracted position where the ramp confronts and extends parallel to the platform and an extended position where the ramp projects outwardly from the platform and is substantially coplanar with the platform. The ramp provides a planar surface between the ground and the platform when the latter is in the lower position, and acts as a vertically extending barrier (when in an intermediate position midway between the retracted and extended positions) for preventing a wheelchair from rolling off the platform when the platform is being moved between lower and upper positions.

Lifts of the type disclosed in the '771 patent typically include a linkage assembly for transmitting force from a hydraulic actuator to the ramp so as to cause the ramp to move between the retracted and extended positions. One portion of the linkage assembly is pivotally attached to the ramp, another portion of the linkage assembly is pivotally attached to the platform, and a third portion of the linkage assembly is attached to the hydraulic actuator. Generally, the linkage assembly is positioned in the center of the ramp and platform, i.e., midway between the left and right sides of the ramp and platform as viewed from the road looking; into the stairwell in which the lift is positioned.

Linkage assemblies of the type used in the '771 patent project above the surface of the ramp and platform more than is desired, e.g., as much as one inch. As a consequence of the central placement of the linkage assembly and its projecting; configuration, a hump is formed which tends to interfere with a wheelchair occupant's use of the lift. Governmental regulations regarding; the design of wheelchair lifts now prohibit structure which projects above the upper surface of the ramp and platform more than 0.25 inch. Clearly, linkage assemblies of lifts of the type disclosed in the '771 patent do not comply with this regulation.

Furthermore, the design of linkage assemblies of the type used on the lift of the '771 patent typically include undesirably large openings or gaps between the various elements making up the linkage assembly and between the linkage assembly and the apertures in the ramp and platform in which the linkage assembly is received. These gaps open out to the upper surfaces of the platform and the ramp and are sufficiently large that the heel of a high-heeled shoe, an end of a cane, or a child's foot could possibly become lodged within a gap between linkage elements. To avoid such an occurrence, flexible covers have been used to block gaps between elements of linkage assemblies. Such covers add to the cost of the linkage assembly, can adversely affect the operation of the linkage assembly, and tend to require frequent maintenance. Absent the use of such covers, the gaps between elements of known linkage assemblies do not comply with current governmental regulations which permit gaps up to only 0.625 inch wide.

The construction of linkage assemblies of the type used in the '771 lift is such that the various components thereof are formed by various machining operations. These operations tend to be relatively time consuming, and hence expensive. Consequently, the total cost of a linkage assembly of the type disclosed in the '771 patent is typically more expensive than is desired.

Linkage assemblies of the type disclosed in the '771 patent are generally designed so that access to the attachment point of the end of the linkage assembly coupled to the ramp is via the bottom surface of the ramp. Because such bottom surface is typically covered with a tread that covers the attachment point, and the process for removing and reinstalling the tread is relatively time consuming, removal of the linkage assembly for maintenance or replacement tends to be more difficult and time consuming than is desired.

The design of linkage assemblies of the type disclosed in the '771 patent is such that the ramp is driven downwardly toward the extended position with a relatively large force. This force is sufficiently great that if a person's feet are positioned underneath the ramp, the possibility exists that the person's feet could be crushed. To avoid the possibility of such an accident, a relief valve for limiting the pressure of the hydraulic fluid supplied to the actuator is provided. Such a relief valve adds to the cost of the lift.

Yet another problem with linkage assemblies of the type disclosed in the '771 patent is that the various components thereof require frequent lubrication, thereby adding to the cost of maintaining the linkage assembly. Furthermore, the design of the components of such known linkage assemblies is such that the components tend to corrode, thereby adversely affecting the free operation of the portions of the lift coupled to the linkage assembly and increasing the stresses applied to various components of the linkage assembly and the lift.

Consequently, a need exists for a linkage assembly for a step lift of the type disclosed in the '771 patent, or for a platform lift of the type disclosed in the '228 patent, that does not project more than 0.25 inch above the upper surfaces of the platform and ramp and that does not include gaps of more than 0,625 inch. A need also exists for such a linkage assembly that can be serviced without removing the tread on the bottom surface of the ramp and that does not require periodic lubrication. A need further exists for a linkage assembly that is designed to drive the ramp downwardly toward the extended position with a force such that a person's feet inadvertently positioned in the path of travel of the ramp will not be crushed. A need additionally exists for a linkage assembly that is made from parts which can be fabricated quickly and inexpensively, preferably without the need for extensive machining operations.

Wheelchair lifts of the type disclosed in the '771 patent typically comprise a horizontal support for supporting the platform and vertically extending members attached, typically by welding, to the ends of the horizontal member. The vertically extending members are slidably received in vertically extending guides attached to the sidewalls of the stairwell in which the lift is installed. The vertically extending members coact with the guides to ensure the platform travels up and down along a predetermined path. Because space constraints permit the hydraulic actuator that raises and lower the step lift to be positioned only adjacent the rear side of the platform assembly, a chain drive assembly is provided for ensuring the front side of the platform assembly moves together with the rear side.

Unfortunately, under certain circumstances the guides do not extend parallel to one another and perpendicular to the surface of the platform. Such misalignment may occur as a consequence of improper installation of the guides, either originally or after maintenance, or can occur due to an accident of the vehicle in which the lift is installed. Furthermore, occasionally the chains of the chain drive assembly will become maladjusted.

Because the vertically extending members are rigidly attached to the horizontal member so as to extend perpendicular thereto, misalignment of the guides or maladjustment of the chains can cause the vertically extending members to bind as they travel up and down in the guides. Such binding can, in certain circumstances, cause the vertically extending members to break where they are attached to the horizontal member. Repair and/or replacement of the broken vertically extending members can be relatively time consuming because it requires the disassembly of a substantial portion of the lift. Space constraints prevent the addition of material to the junction of the vertical extensions and the horizontal support which could increase the strength of such junction sufficiently to prevent breakage.

Although arising in a different technological context, U.S. Pat. No. 4,579,500 to Robinson discloses a truck lift gate comprising a pair of vertical rails, a pair of elongate runners slidably received in the rails, and a platform, the outboard ends of which are pivotally attached to bottom portions of the runners. As a consequence of this construction, the platform is free to pivot slightly with respect to the runners.

The Robinson system differs significantly from lifts of the type disclosed in the '771 patent in that with the Robinson system forces for raising and lowering the platform are simultaneously applied to both ends of the platform. Furthermore, the Robinson system includes a pair of flat equalizer plates positioned adjacent the attachment point of the runners and the platform for causing the top surface of the platform to remain perpendicular to the long axes of the runners during vertical movement of the platform. Unfortunately, space constraints in the environment in which known step lifts are used prohibit the use of such equalizer plates, and prevent the application of the vertical drive force directly to both sides of the platform.

Thus, a need exists for a system for mounting the vertically extending members of a step lift to the horizontal member such that the vertically extending members do not bind or break during vertical movement in the guides in which they are received. A solution to this problem needs to be designed for incorporation into the chain drive system used for ensuring both sides of the step lift platform move together.

SUMMARY OF THE INVENTION

The present invention is a linkage assembly designed for use with a wheelchair lift comprising a platform and a ramp pivotally attached to an outer edge of the platform so as to be rotatable through at least a 180 degree arc between retracted and extended positions. In the retracted position the upper surface of the ramp confronts and extends substantially parallel to the top surface of the platform and in the extended position the ramp extends forwardly of the platform and its upper surface is substantially coplanar with the top surface of the platform. The linkage assembly is designed to transmit force from a linear actuator to the ramp so as to cause the latter to move between the retracted and extended positions.

The linkage assembly comprises a plurality of flat linkage members that are designed so as not to project more than about 0.25 inch above the upper surface of the ramp and the top surface of the platform. The linkage assembly is further designed to provide a structure within the apertures in the ramp and platform through which the linkage assembly extends when the ramp is in the extended position. This structure comprises an upper surface that is substantially coplanar with the upper surface of the ramp and the top surface of the platform. Also, the structure is designed to fill in the apertures such that no gaps exist having a width greater than 0.625 inch.

The linkage assembly is designed to transmit the actuation force provided by the linear actuator to the ramp such that the linkage assembly applies a significantly greater actuation force to the ramp when the latter extends perpendicular to the top surface of the platform than when the ramp is in the retracted or extended positions. As a consequence of this feature, the ramp is driven downwardly toward the extended position with a force which is insufficient to crush a person's feet positioned in the path of travel of the ramp. As an additional consequence of this feature, the force which must be applied to the ramp to move the latter from the perpendicular position toward the extended position is sufficient to strongly resist the force applied by a wheelchair rolling against the ramp.

The present invention also comprises a hinge structure designed for use with a step lift for pivotally coupling the vertical extensions of the platform with the latter so as to permit the vertical extensions to pivot about axes extending perpendicular to the vertical path of travel of the platform as the vertical extensions travel up and down within the guides in which they are slidably received. Furthermore, one of the vertical extensions is coupled with the platform so as to permit one end of the extension to move horizontally with respect to the corresponding end of the other vertical extension as the extensions move up and down with the associated guides. As a consequence of this design, the possibility of the vertical extensions binding within the guides is minimized and the possibility of the vertical extensions breaking free of the platform is avoided.

BRIEF DESCRIPTION OF THE DRAWINGS

FIG. 3 is a side elevational view of the linkage assembly;

FIG. 4 is a top view of the linkage assembly illustrated in FIG. 3;

DETAILED DESCRIPTION OF THE INVENTION

Figure 1:
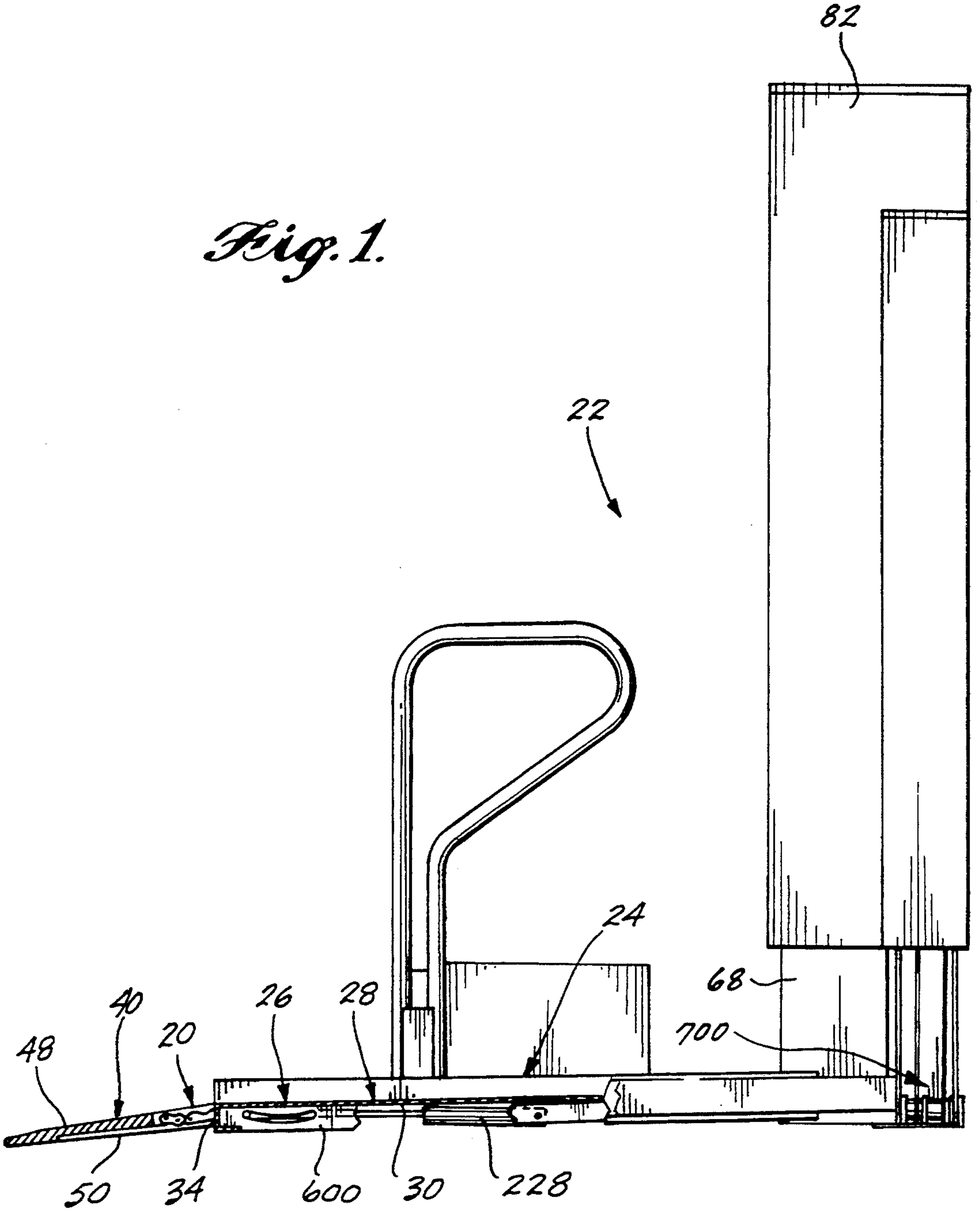
FIG. 1 is a side elevational view of a step lift incorporating the linkage assembly and hinge structure of the present invention, with a portion of the lift being illustrated in cross section to reveal the linkage assembly, and with the lift being illustrated in the platform position.
Figure 2:
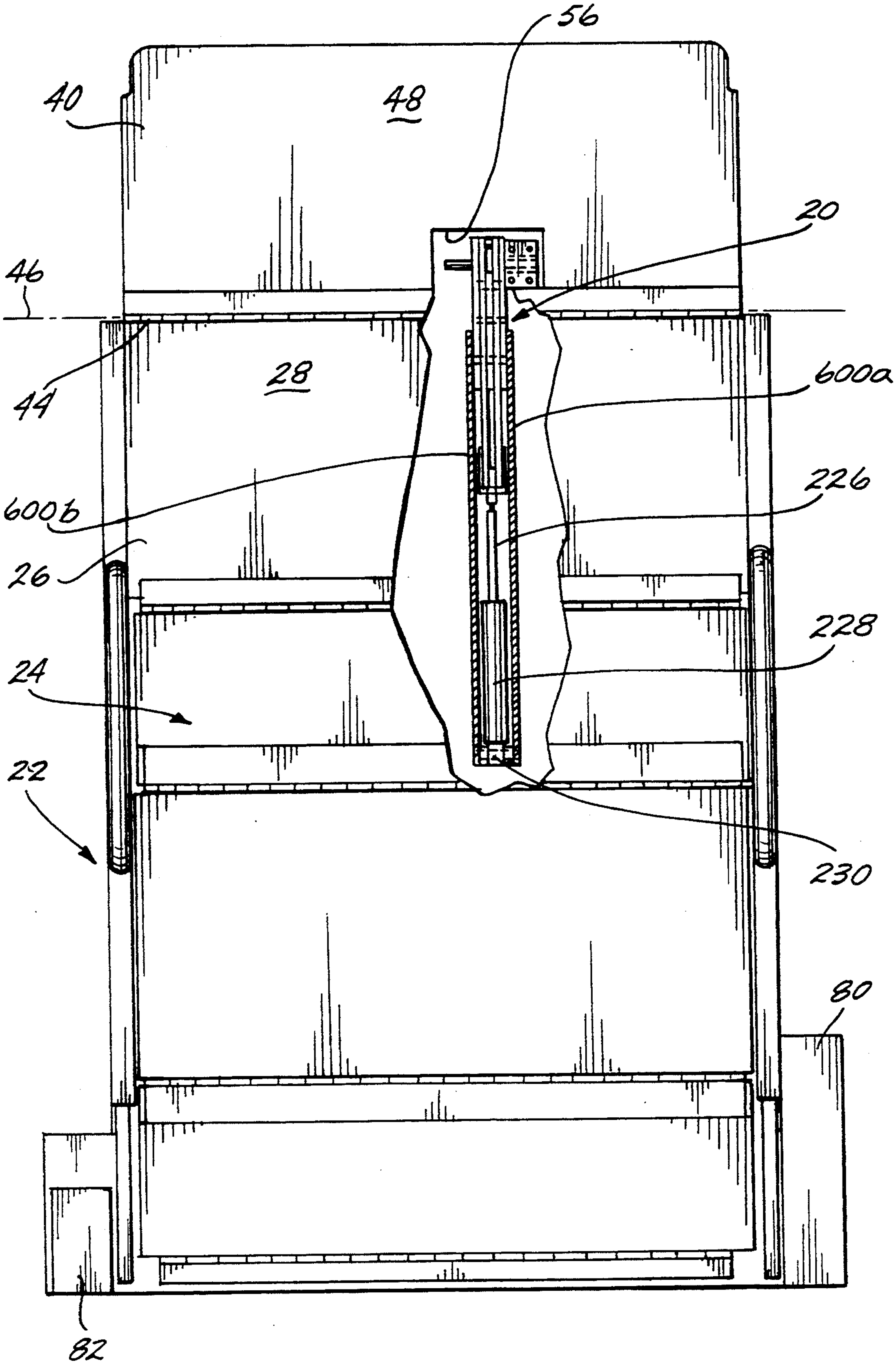
FIG. 2 is a plan view of the step lift illustrated in FIG. 1, with a portion of the platform being cut away to illustrate the linkage assembly and associated hydraulic actuator.
Figures 8, 9:
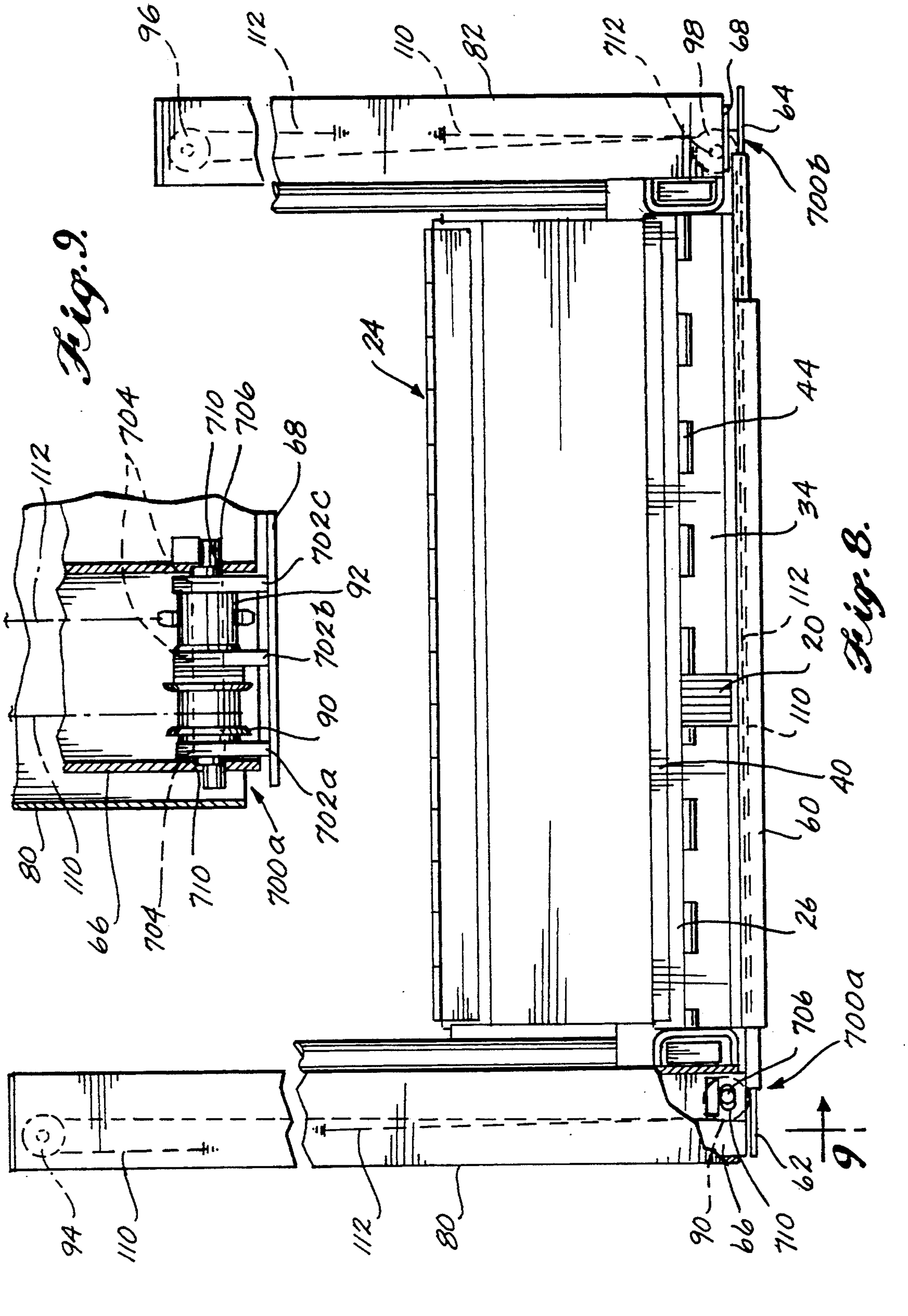
FIG. 8 is a front elevational view of the lift illustrated in FIG. 1, with a portion of one of the guides being broken away to reveal (a) the vertical extension received therein and (b) a portion of the hinge structure for coupling the vertical extension with the horizontal member supporting the platform.
FIG. 9 is a cross-sectional side elevational view, taken along line 9—9 in FIG. 8, showing the bottommost portion of the rear guide and the associated vertical extension, and the rear end of the horizontal member.

Referring to FIGS. 1, 2, and 8, the present invention is a linkage assembly 20 and a hinge structure 700 designed for use in a step lift 22 of the type illustrated in U.S. Pat. No. 4,466,771 to Thorley et al. (the '771 patent"), which patent is incorporated herein by reference, or in a platform lift (not shown) of the type illustrated in U.S. Pat. No. 4,058,228. Lift 22 comprises a platform assembly 24 which is designed to be translated between (1) a platform position, as illustrated in FIGS. 1 and 2, where the various components of the platform assembly together define a platform, and (2) a step position, as illustrated in FIG. 8, where the various components of the platform assembly together define a stairway. As discussed in detail in the '771 patent, lift 22 comprises structure for causing platform assembly 24 to move between the platform and step positions. Lift 22 also comprises structure for causing the platform assembly 24 to move between a lower position, where the platform is positioned at ground level, and an upper position, where the platform is positioned at the level of the floor of the transit vehicle in which the lift is installed. Platform assembly 24 includes an outer platform member 26 having a planar upper surface 28 and a bottom surface 30. Platform member 26 also includes a rectangular aperture 32 extending therethrough which begins adjacent outer edge 34 of the member and extends away from the front edge a predetermined distance.

Referring to FIGS. 1 and 5–7, a ramp 40 is pivotally attached to the outer edge 34 of platform member 26 via hinge 44 so as to be rotatable about a pivot axis 46 which preferably extends along the plane of the upper surface of member 26. Ramp 40 comprises a planar top surface 48, a bottom surface 50, and a pocket 52 (FIG. 5) which opens up to top surface 48. Pocket 52 is aligned with aperture 32 in platform member 26 and is positioned adjacent hinge 44. Ramp 40 includes two studs, one of which is identified at 54 in FIGS. 5–7, positioned adjacent pocket 52. Studs 54, as described hereinafter, lie in the path of travel of drag links 500. Ramp 40 also includes an aperture 56 (FIG. 2) adjacent the end of the ramp attached to hinge 44 and is aligned with aperture 32 in platform member 26.

Figure 5:
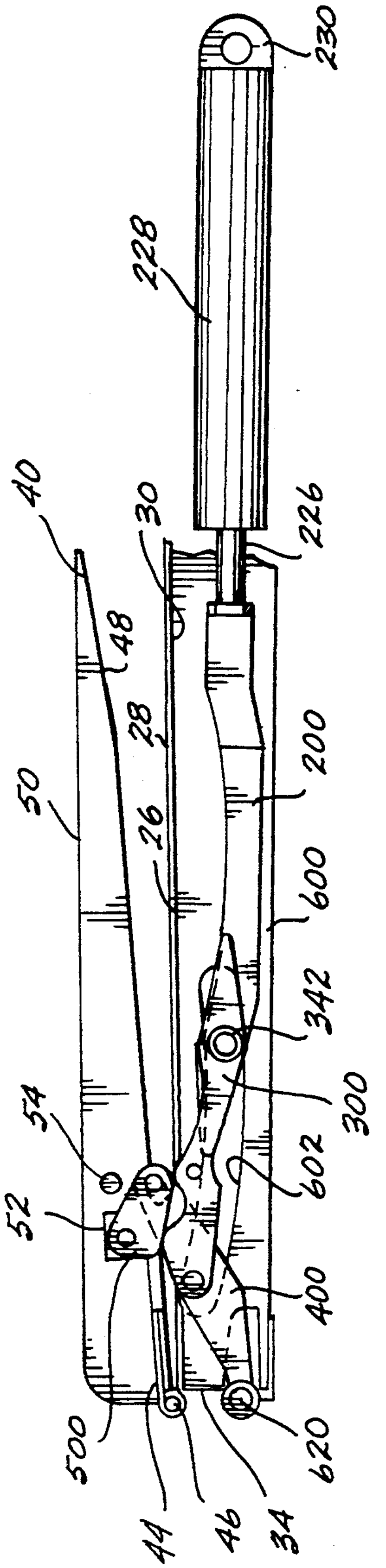
FIG. 5 is a cross-sectional view of the ramp and platform illustrating in side elevation the linkage assembly and the associated hydraulic actuator, with the ramp being shown in the fully retracted position where the top surface of the ramp confronts and extends substantially parallel with the upper surface of the platform.
Figure 6:
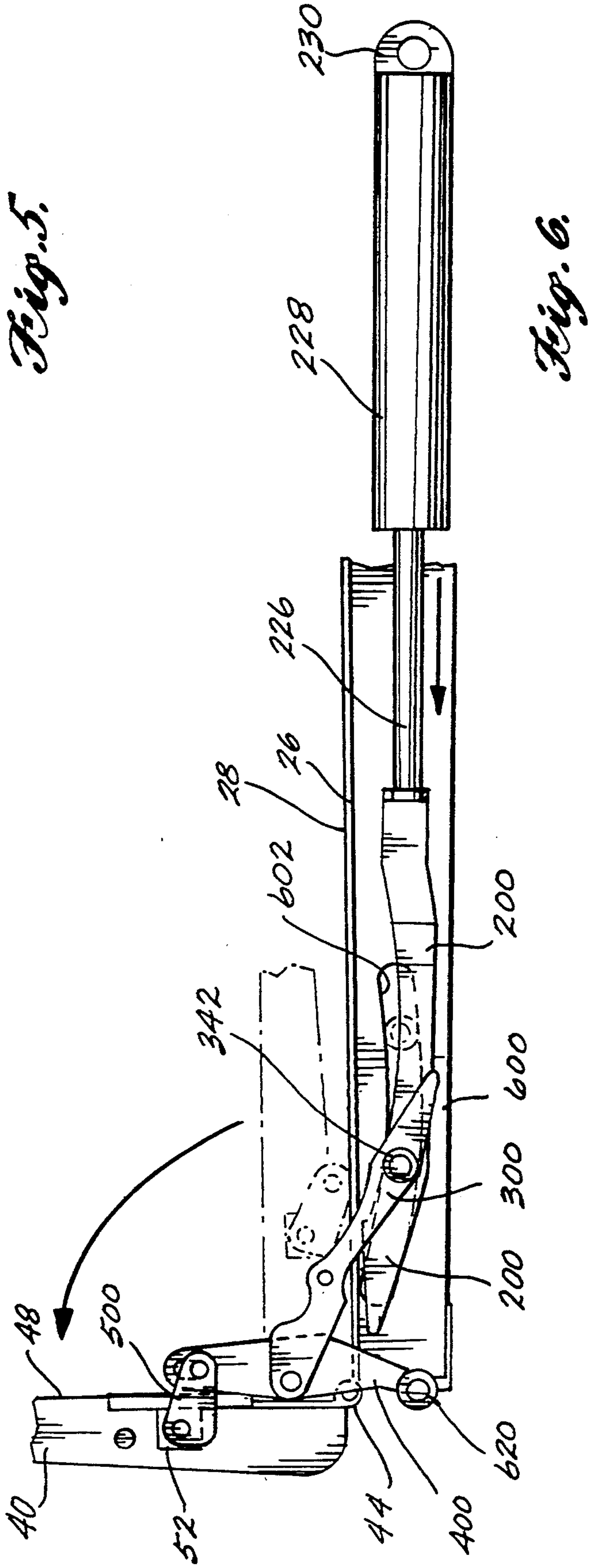
FIG. 6 is similar to FIG. 5, except that the ramp is shown in the barrier position where the top surface of the ramp extends substantially perpendicular to the upper surface of the platform.
Figure 7:
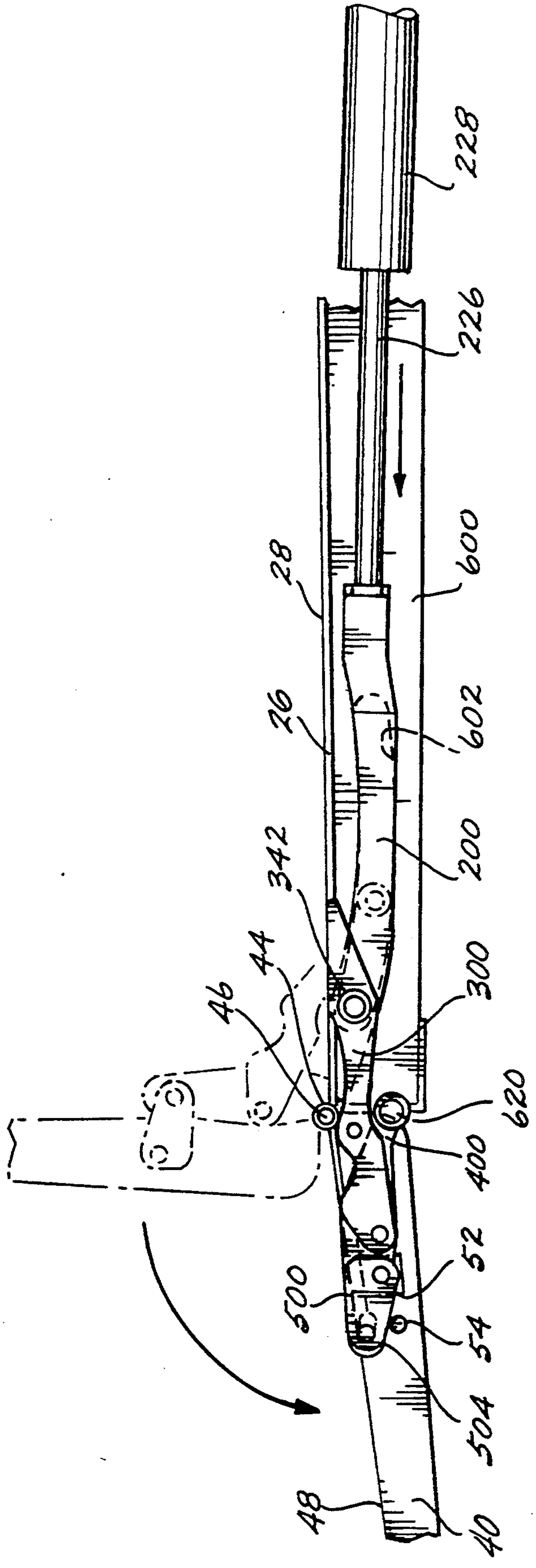
FIG. 7 is similar to FIG. 6, except that the ramp is shown in the fully extended position where the ramp projects from the platform and the top surface of the ramp extends substantially parallel to the upper surface of the platform.

As a consequence of the pivotal attachment of ramp 40 to platform member 26, the ramp may be moved from a retracted position, as illustrated in FIG. 5, through a barrier position, as illustrated in FIG. 6, and to an extended position, as illustrated in FIG. 7. In the retracted position, top surface 48 confronts and extends substantially parallel to upper surface 28. In the barrier position, top surface 48 extends perpendicular to upper surface 28. In the extended position, ramp 40 projects forwardly of platform member 26 such that the top surface 48 of the ramp is substantially coplanar with upper surface 26 of platform member 26. Thus, ramp 40 may be rotated about pivot axis 46 through an are of more than 180 degrees.

Referring to FIG. 8, lift 22 includes a horizontal support 60 positioned beneath and attached to platform member 26. Support 60 includes a rear end 62 and a front end 64. As used herein in conjunction with the description of lift 22, "rear" means those portions of the lift to the left of center, as viewed in FIG. 8, and "front" means those portions of the lift to the right of center. This terminology is used because when lift 22 is installed in the stairwell of a transit vehicle, the portions of the lift to the left of center are closer to the rear of the vehicle and the portions of the lift to the right of center are closer to the front of the vehicle. Lift 22 also includes a rear vertical extension 66 that is attached to rear end 62 of support 60 and a front vertical extension 68 that is attached to front end 64 of support 60. Vertical extensions 66 and 68 have a U-shaped configuration, when viewed in cross section, and are attached to support 60 via hinge structure 700 of the present invention, as discussed hereinafter.

As illustrated in FIGS. 1, 2 and 8, lift 22 also comprises a rear guide 80 and a front guide 82. Guides 80 and 82 are hollow columns which are sized to receive vertical extensions 66 and 68, respectively, with a sliding fit. Thus, guides 80 and 82 define elongate pathways along which vertical extensions 66 and 68 travel as platform assembly 24 is being raised and lowered. Guides 80 and 82 are attached to rear and front sidewalls (not shown), respectively, of the stairwell of the transit vehicle in which lift 22 is installed so as to extend parallel to one another, and perpendicular to upper surface 28 of platform member 26.

As described in greater detail in the '771 patent, lift 22 comprises a hydraulic actuator (not shown) positioned in rear guide 80 for causing platform assembly 24 to move between ground and floor level positions. One end of the actuator is attached to guide 80 and the other end of the actuator is attached to the rear side platform assembly 24 such that when the piston rod of the actuator is extended and retracted the platform moves between the ground and floor level positions. Thus, the raising and lowering force provided by the actuator is directly applied to only one side of the platform assembly 24.

Lift 22 includes a chain drive assembly, which is also described in greater detail in the '771 patent, for causing the front side of platform assembly 24, i.e., the end attached to front vertical extension 68, to move together with the rear side of the platform assembly. Thus, the chain drive assembly causes platform assembly 24 to remain perpendicular to the long axes of guides 80 and 82 as the platform is moved between the ground and floor level positions.

Referring to FIGS. 8 and 9, the chain drive assembly comprises three sheaves and three sprockets. Sheave 90 (FIG. 9) is paired with sprocket 92 (FIG. 9), both of which are pivotally mounted adjacent the junction of vertical extension 66 and rear end 62 of support 60, as described in greater detail hereinafter. Sheave 94 is mounted adjacent the upper end of guide 80, sprocket 96 is mounted adjacent the upper end of guide 82, and sprocket/sheave pair 98 is mounted adjacent the junction of vertical extension 68 and front end 64 of support 60. Sprocket/sheave pair 98 comprises a sheave and a sprocket (not shown) which are identical, respectively, to sheave 90 and sprocket 92. A leaf chain 110 is attached to guide 80 below sheave 94, extends around sheave 94 and downwardly to sheave 90, around the latter and across support 60 to the sheave of pair 98, around the latter and upwardly to an attachment point on guide 82 positioned below pair 96. A roller chain 112 is attached to guide 82 below sprocket 96, extends around sprocket 96 and downwardly to the sprocket of pair 98, around the latter and across support 60 to sprocket 92, around the latter and upwardly to an attachment point on guide 80 positioned below sheave 94.

Referring to FIGS. 3 and 4, linkage assembly 20 comprises elongate clevis links 200*a* and 200*b*. The latter have an identical configuration and are preferably made from flat plates of steel having a thickness of about 0.31 inch. Clevis links 200 each have a gradually curving concave upper surface 202, a flat bottom surface 203 and a triangularly shaped outer portion 204 having a flat upper surface 206 and a gradually curving bottom surface 208 which join at an outer end 210. Surfaces 206 and 208 extend transversely relative to one another such that an angle of about 15 degrees is included between the surfaces. Clevis links 200*a* and 200*b* each terminate at an inner edge 212 which extends substantially perpendicular to the long axes of the links. Clevis links 200*a* and 200*b* each include a bore 214 (FIG. 4) extending therethrough, positioned beneath the junction of surfaces 206 and 202 and approximately centered within the width of the clevis link.

In one embodiment of the present invention (hereinafter referred to as the "exemplary embodiment"), clevis links 200*a* and 200*b* each have a length of 7.84 inches, as measured between outer end 210 and inner edge 212 along an axis extending parallel to bottom surface 203. In the exemplary embodiment, the center of bore 214 is spaced 6.00 inches from rear edge 212, as measured along an axis extending parallel to bottom surface 203, and upper surface 206 has a length of about 1.75 inches.

The portions of clevis links 200*a* and 200*b* adjacent inner edges 212 are attached to a U-shaped bracket 220 having s threaded bore 222 therein for receiving threaded end 224 of rod 226 of hydraulic actuator 228. The latter is positioned underneath platform assembly 24, and an inboard end 230 of actuator 228 is pivotally attached to the platform assembly, as illustrated in FIG. 2. Bracket 220 is designed to support clevis links 200*a* and 200*b* in spaced relation such that a predetermined space is provided between the links. In the exemplary embodiment, hydraulic fluid is provided to hydraulic actuator 228 at about 1200 psi, piston rod 226 has a diameter of 0.625 inch and actuator 228 has an internal diameter of 1.00 inch.

Linkage assembly 20 also comprises connecting links 300*a*, 300*b*, and 300*c*. The latter are identical in configuration and are preferably made from steel plate having s thickness of about 0.31 inch. Each of the connecting links 300 includes a triangularly shaped inner portion 302 having a flat upper surface 304 and a flat bottom surface 306, which surfaces join at inner end 308 and include an angle of about 15 degrees. Each connecting link 300 includes a first concave depression 310 in the upper surface thereof and a second concave depression 312 in the upper surface inwardly of the first depression (i.e. to the right of the first depression, as viewed in FIG. 3). Each of the connecting links 300 also include a concave depression 314 in the bottom surface thereof. The outermost portion 316 of the bottom surface of connecting links 300 is flat. Furthermore, each of the links 300 include a bore 318 (FIG. 3) extending therethrough adjacent the outer end thereof, a bore 320 (FIG. 3) extending through an intermediate portion thereof and positioned between depressions 310 and 312, and a third bore 322 (FIG. 3) positioned at the junction of triangular inner portion 302 with the remainder of the connecting link.

In the exemplary embodiment, connecting links 300 have a length of 6.03 inches, as measured between the outermost portion and the innermost portion of the connecting links. Also, the center of bore 318 is spaced 3.87 inches from the center of bore 322, and the center of bore 318 is spaced 1.78 inches from the center of bore 320. Also, as measured along axes extending perpendicular to flat bottom surface portion 316, bore 318 is positioned 0.125 inches below bore 320, and bore 318 is positioned 0.187 inches above bore 322.

The outer portion 204 of clevis link 200*a* is positioned between inner portions 302 of connecting links 300*a* and 300*b*, and the outer portion 204 of clevis link 200*b* is positioned between inner portions 302 of connecting links 300*b* and 300*c*. The clevis links 200 are pivotally attached to the connecting links 250 via a pin 340 (FIGS. 3 and 4) extending through bores 214 in the clevis links and bores 322 in the connecting links. Pin 340 is sized to project outwardly of the outer side surfaces of connecting links 300*a* and 300*c*, and wheels 342 are attached to the projecting ends of the pin so as to rotate with the pin and prevent the clevis links and connecting links from moving laterally away from one another. Connecting links 300 are also held together by a pin 344 received in bores 320 with an interference fit.

Linkage assembly 20 also comprises control levers 400*a* and 400*b*. The latter have an identical configuration and are preferably made from steel plate having a thickness of about 0.31 inch. Control levers 400*a* and 400*b* each comprise a flat upper surface 402, a flat bottom surface 404 which extends transversely to the upper surface such that an angle of about 11 degrees is included between the surfaces. Surfaces 402 and 404 join one another at curved outer end 406 (FIG. 3). Control levers 400*a* and 400*b* taper to small inner portion 408 having a bore 410 extending therethrough. Each of the control levers 400*a* and 400*b* includes an oval slot 412 extending through the outer portion thereof, and a bore 414 extending through a central portion thereof. Slot 412 is aligned so that its long axis extends parallel to upper surface 402.

In the exemplary embodiment of linkage assembly 20, control levers 400 have a length of 4.36 inches, as measured between outer end 406 and the innermost surface of inner portion 408 along an axis extending parallel to upper surface 402. The center of oval slot 412 is spaced 3.70 inches from the center of bore 410, and the center of bore 414 is spaced 2.08 inches from the center of bore 410. The center of slot 412 is positioned 0.306 inches above the center of bore 414, and the center of bore 410 is positioned 0.389 inches below the center of bore 414, as measured along axes extending perpendicular to upper surface 402.

The inner half of control lever 400*a* is positioned between the outer portions of connecting links 300*a* and 300*b*, and the inner portion of control lever 400*b* is positioned between the outer portions of connecting links 300*b* and 300*c*. Control levers 400 are pivotally attached to connecting links 300 via a pin 420 which is received in bores 318 in connecting links 300 with a sliding fit and is received in bores 414 in control levers 400 with an interference fit.

Linkage assembly 20 further comprises drag links 500*a* and 500*b*. The latter have an identical configuration and are preferably made from steel plate having a thickness of about 0.31 inch. Drag links 500*a* and 500*b* each include a flat upper surface 502, a flat bottom surface 504, which surfaces join at curved outer end 506 and include an angle of about 15 degrees, and a flat inner surface 508. Bore 510 extends through each drag link adjacent the front end 506 thereof, and bore 512 extends through each drag link adjacent the inner end thereof.

In the exemplary embodiment, drag links 500 have a length of 1.54 inches, as measured between front end 506 and rear surface 508 along an axis extending parallel to upper surface 502. The centers of bores 510 and 512 are spaced 1.00 inch apart.

The outermost portions of control levers 400 are received between drag links 500, with drag link 500*a* being positioned next to control lever 400*a* and drag link 500*b* being positioned next to control lever 400*b*. Drag links 500 are pivotally attached to control levers 400 via pin 520 which is received in bores 510 in the drag links with an interference fit and which is received in slots 412 in control levers 400 with a free sliding fit. A spacer 521 is provided between control levers 400*a* and 400*b*. Spacer 521 (FIG. 4) is rotatably mounted on pin 520.

Linkage assembly 20 includes elongate pivot shafts 522 and 524. One end of shaft 522 is received in bore 512 in drag link 500*a* with an interference fit and projects outwardly from the drag link a predetermined distance, e.g., 2 inches, and one end of shaft 524 is received in bore 512 in drag link 500*b* with an interference fit and projects outwardly from the drag link a similar predetermined distance.

Linkage assembly 20 additionally comprises a pair of bushing blocks, one of which is identified at 540 in FIG. 4, for receiving shafts 522 and 524 such that the shafts are free to rotate about their axes within the bushing blocks. Bushing blocks 540 are received in pocket 52 in ramp 40 such that the axes of rotation of shafts 522 and 524 are coaxial and extend parallel to the rotational axis of hinge 44. By this attachment of shafts 522 and 524 to ramp 40, drag links 500*a* and 500*b* are pivotally mounted to ramp 40. Bushing blocks 540 are held in place in pocket 52 by a plate 542.

Referring to FIGS. 1, 4 and 5, linkage assembly 20 also includes identical support plates 600*a* and 600*b*. The latter are attached to bottom surface 30 of platform member 26 such that plate 600*a* is positioned adjacent the outer sides of clevis link 200*a* and connecting link 300*a* and plate 600*b* is positioned adjacent the outer sides of clevis link 200*b* and connecting link 300*c*. Plates 600*a* and 600*b* begin at front edge 34 and extend inwardly from the front edge a suitable distance, e.g., about 2 feet. Each of the plates 600*a* and 600*b* includes an inclined, arcuate slot 602 extending therethrough adjacent the front portion of the plate. The width of slots 602 is slightly greater than the outside diameter of wheels 342 so that the wheels may roll freely within the slots, as discussed hereinafter. The outer end (i.e., the left end, as viewed in FIG. 5) of each slot 602 is positioned adjacent the upper edge of the support plate 600 and the inner end of the slot is approximately centered within the support plate. In the exemplary embodiment, slots 602 have a length of about 5.5 inches and extend along an arc having a radius of about 12 inches.

In connection with the following discussion of the manner in which linkage assembly 20 is attached to lift 22 and the manner in which linkage assembly 20 operates, reference should be made to FIGS. 2–7. Because shafts 522 and 524 are pivotally attached to ramp 40, as discussed above, drag links 500, spacer 521, the majority of control levers 400, and the outer portions of connecting links 300 are received in aperture 56 in ramp 40 when the latter is in the extended position illustrated in FIGS. 3, 4 and 7.

As best seen in FIGS. 5–7, small inner portion 408 of control levers 400 is pivotally attached to platform member 26 adjacent the outer edge 34 thereof via a pin 620 (FIGS. 5–7). Pin 620 is sized to pivot freely within bores 410 in inner portions 408 and is non-rotatably affixed to platform member 26 such that the longitudinal axis of the pin extends parallel to the axis of rotation of hinge 44. Pin 620 is preferably attached to platform member 26 below hinge 44. In the exemplary embodiment of the present invention, the longitudinal axis of pin 620 is positioned 1.125 inches below the pivot axis 46 of hinge 44 and is vertically aligned with the pivot axis of hinge 44.

When ramp 40 is in the fully extended position (FIGS. 3, 4 and 7), the majority of connecting links 300 and the outer portions of clevis links 200 are positioned in aperture 32 in platform assembly 26. Also in this position, wheels 342 are received in the outermost portions of slots 602 in support plates 600. The inner portions of clevis links 200 extend underneath platform member 26 adjacent its bottom surface 30, and are attached via U-shaped bracket 220 to rod 226 of hydraulic actuator 228.

Assuming ramp 400 is initially in the retracted position illustrated in FIG. 5, the ramp is caused to move toward the extended position by causing hydraulic actuator 228 to operate such that its piston rod 226 is extended. As piston rod 226 moves toward outer edge 34, it drives clevis links 200 toward the outer edge. This outward movement of the clevis links is transmitted via pin 340 to connecting links 300, thereby causing the latter to move outwardly and upwardly. Wheels 342 roll within slots 602 during this movement of the clevis links and connecting links.

The outward and upward movement of connecting links 300 is transmitted to control levers 400 via pin 420 causing the control levers to initially move toward a vertically extending position, as illustrated in FIG. 6. This movement of control levers 400 is transmitted via pin 520 to drag links 500 which, in turn, cause ramp 40 to move upwardly from the retracted position illustrated in FIG. 5 toward the barrier position illustrated in FIG. 6.

Connecting links 300 and control levers 400 together provide a moment arm which becomes increasingly large as the ramp 40 approaches the vertically extending position it assumes in the barrier position. Thus, the linkage assembly 20 transmits a smaller portion of the force provided by actuator 228 to ramp 40 when the ramp is in the retracted position than when the ramp is in the barrier position. An important aspect of this change in the mechanical advantage provided by linkage assembly 20 is that when ramp 40 is in the barrier position, the position to which it is moved when a wheelchair and occupant are being raised and lowered, a relatively large force is required to drive the ramp 40 outwardly toward the extended position. As a consequence, linkage assembly 20 and actuator 228 strongly resist the tendency of ramp 40 to pivot outwardly when a heavily loaded wheelchair rolls against ramp 40.

Additional extension of piston rod 226 causes the elements of linkage assembly 20 to drive ramp 40 toward the extended position illustrated in FIG. 7. As ramp 40 approaches the extended position, the axes of pin 520, pin 420, and pin 340 begin to nearly line up, i.e., lie on a common plane. In fact, during the last few degrees of downward travel of ramp 40, the axis of pin 520 drops below the plane on which pins 340 and 420 lie, i.e., pin 520 moves to an "over center" position. As a consequence of this alignment of pins 340, 420 and 520, the length of the moment arm provided by connecting links 300 and control levers 400 is reduced significantly such that the force applied to ramp 40 as it approaches the extended position is much less than the force applied to the ramp when it is in the barrier position.

With the exemplary embodiment, the magnitude of the force provided by linkage assembly 20 to ramp 40 when the latter is in the barrier position (i.e., when ramp 40 is at about the halfway point in its travel through the 180° arc) is at least four times the magnitude of the force provided by the linkage assembly to the ramp during its last few degrees of travel toward or away from the extended position. Similarly, the magnitude of the force the linkage assembly applies to the ramp as the latter approaches the retracted position is about one quarter or less the magnitude of the force the linkage assembly applies to the ramp when the latter is in the barrier position.

As a consequence of this design of the exemplary embodiment of linkage assembly 20, ramp 40 is urged downwardly during the last few inches of travel toward the extended position such that the outermost edge of the ramp provides a downwardly extending force of only about 40 pounds. Thus, a person's feet inadvertently positioned in the path of travel of ramp 40 will not be crushed by the ramp.

An important advantage of the design of linkage assembly 20 responsible for ramp 40 being urged to the extended position with minimal force is that extra controls in the hydraulic circuitry associated with hydraulic actuator 228 are not required. As noted above, known lifts utilize pressure limiting valves in conjunction with the actuator for limiting the pressure of hydraulic fluid provided to the actuator, thereby limiting the actuation force the actuator can generate.

During the last few degrees of downward travel of ramp 40, bottom surface 504 of drag links 500 will engage studs 54 which projects outwardly so as to lie in the path of travel of the drag links. As a consequence of this engagement, drag links 500 urge studs 54, and ramp 40 attached thereto, downwardly to the fully extended position. Studs 54 are provided because under certain circumstances hinge 44 will resist rotation as a consequence of high frictional forces caused by corrosion of the hinge or other factors. This resistance to rotation coupled with the relatively small actuation force applied to ramp 40 by linkage assembly 20 as the ramp approaches the extended position may be insufficient to drive ramp 40 to the fully extended position.

The elements of linkage assembly 20 are designed and are coupled to ramp 40 and platform member 26 so as to form a four-bar linkage. The latter consists of (1) the portion of platform member 26 adjacent its outer edge 34 between the pivot axis 46 of hinge 44 and the longitudinal axis of pin 620, (2) the portion of ramp 40 between the pivot axis of hinge 44 and the longitudinal axis of shafts 522 and 524, (3) drag links 500, and (4) control levers 400. As noted above, the pivot axes where the four links in the four-bar linkage are attached approach coplanar alignment when ramp 40 is in the extended position. In fact, during the last few degrees of downward travel of ramp 40 pin 520 moves to an "over-center" position, with the result that the above-described four-bar linkage cannot urge ramp 40 to the fully extended position. By providing studs 54 adjacent drag links 500, the latter will drive ramp 40 downwardly through the last few degrees of travel to the fully extended position, thereby overcoming the above-noted limitation in the ability of the four-bar linkage to transmit drive forces to the ramp when approaching the fully extended position.

As ramp 40 approaches the extended position, wheels 342 begin to travel upwardly as a consequence of the inclined configuration of the slots 602 in which they are received. This upward movement drives triangular inner portion 302 of connecting links 300 upwardly in aperture 32 in platform member 26 until the flat upper surfaces 304 of the triangular portions are approximately coplanar with upper surface 28 of the platform member. Similarly, triangular outer portions 204 of clevis links 200 are driven upwardly into aperture 32 until the flat upper surfaces 206 of the outer portions are approximately coplanar with surface 28. When in this position, surfaces 206 and 304 together define a planar structure which fills in aperture 32 in platform member 26 such that no gaps of greater than 0.625 inch exist between elements of linkage assembly 20 or between the edges of aperture 32 and the linkage assembly. Furthermore, the upper surface of such structure is substantially coplanar with top surface 28 of platform member 26.

Furthermore, when ramp 40 is in the extended position, flat upper surface 402 of control levers 400, upper surface 502 of drag links 500, and the high portions of connecting links 300 on either side of concave depression 310 in the top surface of the connecting links are positioned in aperture 56 in ramp 40. Together, these elements define a planar structure which fills in aperture 56 in ramp 40 such that no gaps greater than 0.625 inch in width exist between the elements of the linkage assembly or between the edge of aperture 56 and the linkage assembly. Furthermore, the upper surface of such structure is substantially coplanar with the top surface 48 of ramp 40.

Concave depressions 314 are provided in the bottom surface of connecting links 300 so that when the linkage assembly is in the fully extended position the bottom surface of the connecting links will not engage projecting portions of pin 620. Concave depressions 312 are provided in the upper surface of connecting links 300 so that as the connecting links are moving outwardly and upwardly or inwardly and downwardly, the upper surface will not contact the inner edge of aperture 32 in platform member 26. Concave depressions 310 are provided in connecting links 300 to receive portions of the drag links 500 when ramp 40 is in the retracted position, as illustrated in FIG. 5.

Linkage assembly 20 causes ramp 40 to move from the extended position to the retracted position in exactly the reverse manner in which the linkage assembly deploys the ramp.

Clevis links 200, connecting links 300, control levers 400, and drag links 500 are designed so that when ramp 40 is in the extended position, no portion of these elements projects more than 0.25 inch above top surface 48 of the ramp and upper surface 28 of platform portion 26.

For ease of description, the extended position of ramp 40 has been described as the position where top surface 48 of ramp 40 is "substantially" coplanar with upper surface 28 of platform member 26. More precisely described, however, top surface 48 extends slightly downwardly with respect to upper surface 28. Linkage assembly 20 is designed to drive ramp 40 to such an "over center" position so as to minimized the effort required to move a wheelchair up onto platform member 26. That is, in the extended position ramp 40 provides a substantially continuous surface from ground level to upper surface 28 of platform member 26.

During the travel of ramp 40 from the retracted position to the extended position, pin 520 positioned in oval slot 412 in control levers 400 will move from the outer end of the slot to the inner end of the slot. Then as ramp moves past the barrier position toward the extended position pin 420 will move within slot 412 to the outer end of the slot. Slot 412 is provided for two reasons. First, the manufacturing tolerances required to produce linkage assembly 20 are reduced by providing a slot instead of a bore. For instance, if the length of one of the elements of linkage assembly 20 is slightly longer than intended, or the placement of one of the bores in the elements is inaccurate, pin 420 is free to shift slightly within slot 412 to accommodate such manufacturing errors. Second, when ramp 40 is being raised from both the retracted position and the extended position, linkage assembly 20 will move independently of ramp 40 a small amount before it begins raising the ramp as pin 520 moves from one end to the other of slot 412. As a consequence of this movement of pin 520, the linkage assembly moves to a position where the mechanical advantage it provides is sufficiently great that ramp 40 is easily raised.

Because clevis links 200, connecting links 300, control levers 400, and drag links 500 are all made from flat plates of steel, the linkage assembly may be manufactured very inexpensively using conventional laser burning processes. When manufactured in this manner, substantially the only machining required in the fabrication of linkage assembly 20 is the drilling of the bores and slots discussed above.

Because the pins used to pivotally attach the various elements of the linkage assembly are preferably made from hardened steel, because clevis links 200, connecting links 300, control levers 400 and drag links 500 are preferably made from cadmium-coated steel plate, and because the diameter of wheels 342 is less than, e.g., 0.027 inches less than, the width of slots 602 in support plates 600, the linkage assembly will operate freely without lubrication. As a consequence, the cost of maintaining the present linkage assembly is far less than the cost of maintaining its prior art counterparts.

As a consequence of the design of linkage assembly 20, it is relatively easy to install and remove the latter. More specifically, by attaching the outer end of the linkage assembly to ramp 40 such that access to the linkage assembly is obtained via upper surface 48 of the ramp, the need to remove the tread (not shown) which is typically attached to bottom surface 50 of the ramp is avoided.

Turning now to FIGS. 1, 8, and 9, the present invention also comprises a hinge structure 700a for attaching vertical extension 66 to rear end 62 of horizontal support 60, and hinge structure 700*b* for attaching vertical extension 68 to front end 64 of the horizontal support. Hinge structures 700*a* and 700*b* are nearly identical in construction except as noted below.

As illustrated in FIG. 9, hinge structure 700*a* comprises plates 702*a*, 702*b* and 702*c*. These plates are identical in configuration and are attached to the upper surface of rear end 62 so as to project upwardly therefrom in parallel, equally spaced relation. Plates 702*a*–702*c* each include a bore 704 extending therethrough, with the bores of each of the plates being coaxially aligned. A pivot rod 706 is received in bores 704 with a sliding fit. Rod 706 is sized to extend a predetermined distance outwardly of plates 702*a* and 702*c*. Sheave 90 is rotatably mounted on the portion of rod 706 positioned between plates 702*a* and 702*b*, and sprocket 92 is rotatably mounted on the portion of rod 706 positioned between plates 702*b* and 702*c*. Thus, plates 702*a*, 702*b* and 702*c* together define a bracket for supporting sheave 90 and sprocket 92.

Rear vertical extension 66 includes opposed oval slots 710 in the inner and outer sidewalls thereof. The long axes of slots 710 are positioned so as to extend perpendicular to the long axis of vertical extension 66 and parallel to the long axis of horizontal support 60. Slots 710 are positioned adjacent, e.g., about 1 inch up from, the bottom of vertical extension 66.

Vertical extension 66 is positioned relative to plates 702*a*–702*c* such that the plates are received within the U-shaped space defined by cross-sectional configuration of the extension. The outwardly projecting ends of rod 706 are pivotally received in slots 710, whereby the bottom end of vertical extension 66 is pivotally attached to rear end 62 of horizontal support 60 so as to be pivotable about an axis extending perpendicular to the long axis of the vertical extension and perpendicular to the long axis of horizontal support 60.

Hinge structure 700*b* is identical to hinge structure 700*a*, except that pivot rod 706 is pivotally received in opposed bores 712 instead of opposed slots 710.

By pivotally attaching vertical extensions 66 and 68 to horizontal support 60 via hinge structures 700*a* and 700*b*, the vertical extensions are free to assume paths of travel up and down inside guides 80 and 82, respectively, which extend in parallel to the long axes of the guides. Consequently, if the chains of the chain drive assembly become readjusted, causing the front side of platform assembly 24 to droop slightly, the vertical extensions 66 and 68 will pivot slightly relative to horizontal support 60 about the axes of rods 706 so as to permit the vertical extensions to slide freely up and down inside the guides.

Oval slots 710 are provided in vertical extension 66 so as to permit the horizontal spacing between the bottom ends of vertical extensions 66 and 68 to vary slightly. If guides 80 and 82 are misaligned, i.e., do not extend in parallel, the bottom end of vertical extension 66 will move horizontally slightly so as to permit the vertical extensions to realign themselves during their travel up and down guides 80 and 82. Such horizontal adjustment, together with the pivotal movement of the vertical extensions 66 and 68 about the axes of rods 706, permits the vertical extensions to slide freely during their travel within guides 80 and 82.

Even in the case of severe misalignment of guides 80 and 82, or severe maladjustment of the chains of the chain drive mechanism, vertical extensions 66 and 68 will only bind within guides 80 and 82, respectively. The ends of the vertical extensions 66 and 68 will not break free of the horizontal support 60. This design feature is an important advantage over prior art lifts having vertical extensions which are integrally attached to the horizontal support. When such vertical extensions break free of the horizontal support, difficult and time-consuming repairs are required.

Since certain changes may be made in the above-described apparatus without departing from the scope of the present invention, the foregoing description and accompanying drawings are intended to be interpreted in an illustrative, and not in a limiting, sense.

The embodiments of the invention in which an exclusive property or privilege is claimed are defined as follows:

1. A wheelchair lilt designed to be installed in an entryway of a transit vehicle, the lilt comprising:

a platform having a length and a width, said width being defined by first and second sides of said platform at opposite sides of said entryway, said platform being movable between upper and lower positions;

an actuator coupled with said platform to move said platform between said upper and lower positions;

first and second vertical extensions operatively connected to said platform adjacent said first and second sides of said platform, respectively;

a first guide mountable to a vehicle in which the list is installed for receiving said first vertical extension and guiding said first vertical extension along a first path as said platform is caused to move between said upper and lower positions;

a second guide mountable to said vehicle in which said lift is installed for receiving said second vertical extension and guiding said second vertical extension along a second path as said platform is caused to move between said upper and lower positions;

chain means coupled to said platform, said first and second vertical extensions, and said first and second guides for maintaining said platform substantially in predetermined geometric relation to said first and second guides as said platform is caused to move between said upper and lower positions; and pivot means for coupling an end of each of said first and second vertical extensions with said platform so as to permit (a) said first vertical extension to pivot about a first axis relative to said platform, said first axis being generally horizontal and running generally in a direction along said length of said platform; and (b) said second vertical extension to pivot about a second axis relative to said platform, said second axis being generally horizontal and running generally in a direction along said length of said platform.

2. A lift according to claim 1, wherein said pivot means allows one end of each of said first and second vertical extensions to move back and forth along a path extending in a widthwise direction relative to said platform.

3. A lift according to claim 1, wherein said platform comprises a horizontal member having first and second ends, and wherein said pivot means comprises:

a first mounting assembly including (a) a first bracket sized to receive at least one sprocket, said first bracket being attached to said first end of said horizontal member, (b) a first pivot shaft mounted to said first bracket, and (c) at least one sprocket mounted on said first pivot shaft so as to be rotatable relative to said first bracket about said first axis; and a second mounting assembly including (a) a second bracket sized to receive at least one sprocket, said second bracket being attached to said second end of said horizontal member, (b) a second pivot shaft mounted to said bracket, and (c) at least one sprocket mounted on said second pivot shaft so as to be rotatable relative to said second bracket about said second axis.

4. A lift according to claim 3, wherein one end of said first vertical extension is pivotally attached to said first bracket via said first pivot shaft and one end of said second vertical extension is pivotally attached to said second bracket via said second pivot shaft.

5. A wheelchair lift designed to be installed in an entryway of a transit vehicle having a front and a rear, the lift comprising:

a platform having a front side and a rear side relative to the front and the rear of a vehicle in which the lift is installed, said platform being movable between upper and lower positions;

an actuator coupled with said platform to move said platform between said upper and lower positions;

first and second vertical extensions operatively connected to said platform;

a first guide mountable to the vehicle in which the lift is installed for receiving said first vertical extension and guiding said first vertical extension along a first path as said platform is caused to move between said upper and lower positions, said first guide comprising a hollow column sized to receive said first vertical extension with a sliding fit;

a second guide mountable to the vehicle in which the lift is installed for receiving said second vertical extension and guiding said second vertical extension along a second path as said platform is caused to move between said upper and lower positions, said second guide comprising a hollow column sized to receive said second vertical extension with a sliding fit;

a chain drive assembly attached to said platform, said first and second vertical extensions, and said first and second guides for causing said front side of said platform to move together with said rear side of said platform as said platform is moved between said upper and lower positions, said chain drive assembly including a chain and chain support means for supporting said chain, said chain and chain support means being located within said first and second guides; and first and second hinge assemblies pivotably connecting said platform to said first and second vertical extensions, respectively, said first hinge assembly being located within said first guide and said second hinge assembly being located within said second guide.

* * * * *

UNITED STATES PATENT AND TRADEMARK OFFICE

CERTIFICATE OF CORRECTION

PATENT NO. : 5,433,580

DATED : July 18, 1995

INVENTOR(S) : D. Kempf

It is certified that error appears in the above-indentified patent and that said Letters Patent is hereby corrected as shown below:

| COLUMN | LINE | |
|---|---|---|
| 6 | 30 | "are" should read --arc-- |
| 8 | 16 | "s thickness" should read --a thickness-- |
| 15 (Claim 1, | 56 Line 13) | "list" should read --lift-- |

Signed and Sealed this

Third Day of October, 1995

Attest:

BRUCE LEHMAN

*Attesting Officer*

*Commissioner of Patents and Trademarks*